United States Patent
Kikuchi et al.

(10) Patent No.: US 7,951,251 B2
(45) Date of Patent: *May 31, 2011

(54) ADHESIVE FILM, FLEXIBLE METAL-CLAD LAMINATE INCLUDING THE SAME WITH IMPROVED DIMENSIONAL STABILITY, AND PRODUCTION METHOD THEREFOR

(75) Inventors: Takashi Kikuchi, Shiga (JP); Hiroyuki Tsuji, Shiga (JP); Hisayasu Kaneshiro, Kyoto (JP)

(73) Assignee: Kaneka Corporation, Osaka-shi (JP)

( * ) Notice: Subject to any disclaimer, the term of this patent is extended or adjusted under 35 U.S.C. 154(b) by 1041 days.

This patent is subject to a terminal disclaimer.

(21) Appl. No.: 10/585,141

(22) PCT Filed: Dec. 28, 2004

(86) PCT No.: PCT/JP2004/019850
§ 371 (c)(1),
(2), (4) Date: May 24, 2007

(87) PCT Pub. No.: WO2005/068193
PCT Pub. Date: Jul. 28, 2005

(65) Prior Publication Data
US 2008/0050586 A1    Feb. 28, 2008

(30) Foreign Application Priority Data
Jan. 13, 2004   (JP) ................. 2004-006144

(51) Int. Cl.
*B32B 37/00* (2006.01)
*B32B 37/14* (2006.01)
*B32B 15/08* (2006.01)
*B29C 67/24* (2006.01)

(52) U.S. Cl. ..... 156/196; 156/242; 156/246; 156/330.9; 264/299; 264/319; 264/330; 264/331.19; 428/458

(58) Field of Classification Search ........................ None
See application file for complete search history.

(56) References Cited

U.S. PATENT DOCUMENTS
6,277,495 B1 * 8/2001 Sawasaki et al. ............. 428/458
(Continued)

FOREIGN PATENT DOCUMENTS
JP    48-86957 A    11/1973
(Continued)

OTHER PUBLICATIONS
International Search Report of PCT/JP2004/019850, date of mailing Apr. 19, 2005.
(Continued)

*Primary Examiner* — Monique R Jackson
(74) *Attorney, Agent, or Firm* — Westerman, Hattori, Daniels & Adrian, LLP

(57) ABSTRACT

It is an object of the present invention to provide an adhesive film which is used for producing, by a laminating method, a flexible metal-clad laminate in which the change in dimensions is suppressed, a flexible metal-clad laminate including the adhesive film, and a production method therefor. The present invention relates to an adhesive film including a polyimide film and an adhesive layer containing a thermoplastic polyimide, the adhesive layer being disposed on at least one surface of the polyimide film, a flexible metal-clad laminate produced by laminating a metal foil to the adhesive film with a thermal roll laminator, and a production method therefor, wherein the polyimide film is formed by a process including step (A) of mixing a polyamic acid solution, a dehydrating agent, and an imidization catalyst, and casting and applying the mixture onto a support to form a gel film; step (B) of stripping off the gel film and fixing both ends of the gel film; and step (C) of heating and transporting the film with both ends being fixed in a state loosened in the TD direction.

5 Claims, 4 Drawing Sheets

U.S. PATENT DOCUMENTS

2004/0126600 A1 * 7/2004 Dunbar et al. ............. 428/473.5

FOREIGN PATENT DOCUMENTS

| JP | 57-63254 A | 4/1982 |
| --- | --- | --- |
| JP | 61-264028 A | 11/1986 |
| JP | 62-41024 A | 2/1987 |
| JP | 9-1723 A | 1/1997 |
| JP | 11-157026 A | 6/1999 |
| JP | 2000-84962 A | 3/2000 |
| JP | 2001-270034 A | 10/2001 |
| JP | 2001-270035 A | 10/2001 |
| JP | 2001-270039 A | 10/2001 |
| JP | 2002-179821 A | 6/2002 |
| JP | 2002-321300 A | 11/2002 |
| JP | 2003-21742 A | 1/2003 |
| JP | 2003-165850 A | 6/2003 |

OTHER PUBLICATIONS

Translation of International Preliminary Report on Patentability of PCT/JP 2004-019850 mailed Aug. 31, 2006.

* cited by examiner

FIG. 1  IMAGES OF CROSS-SECTIONS OF FILMS
(BOTH ENDS ARE FIXED WITH THE FILM BEING LOOSENED IN THE TD DIRECTION)
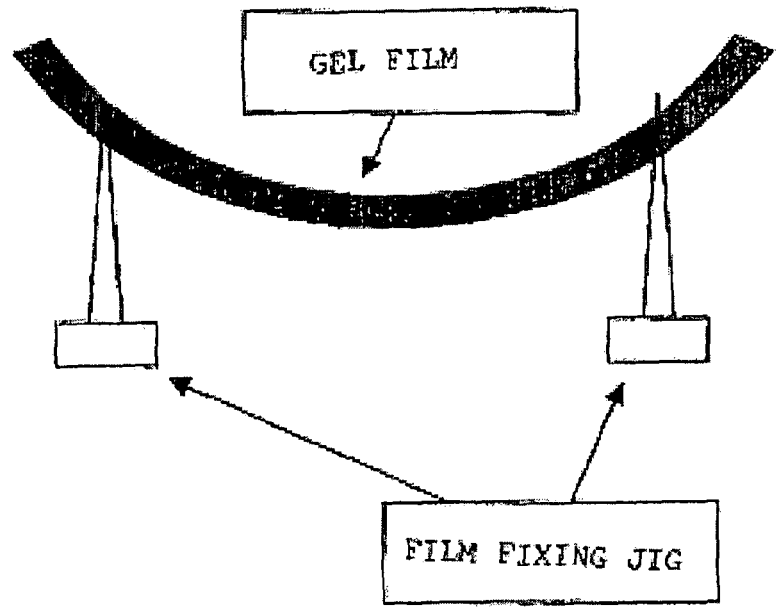
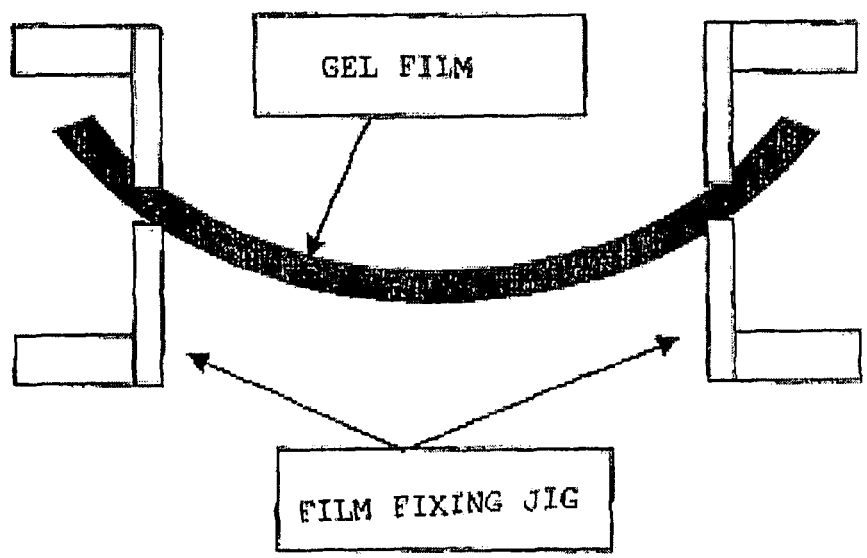

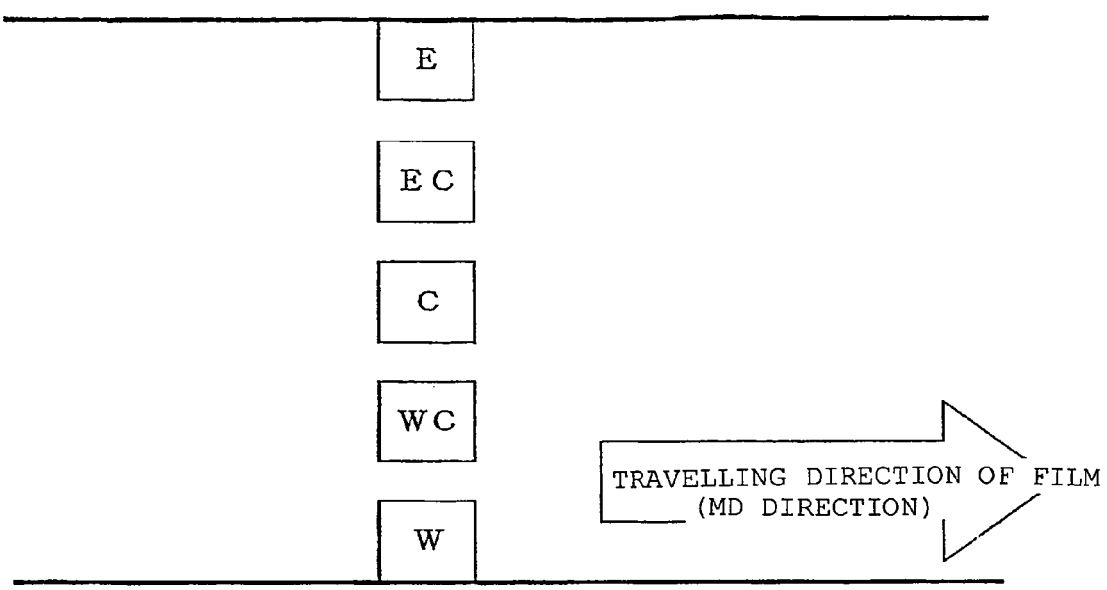

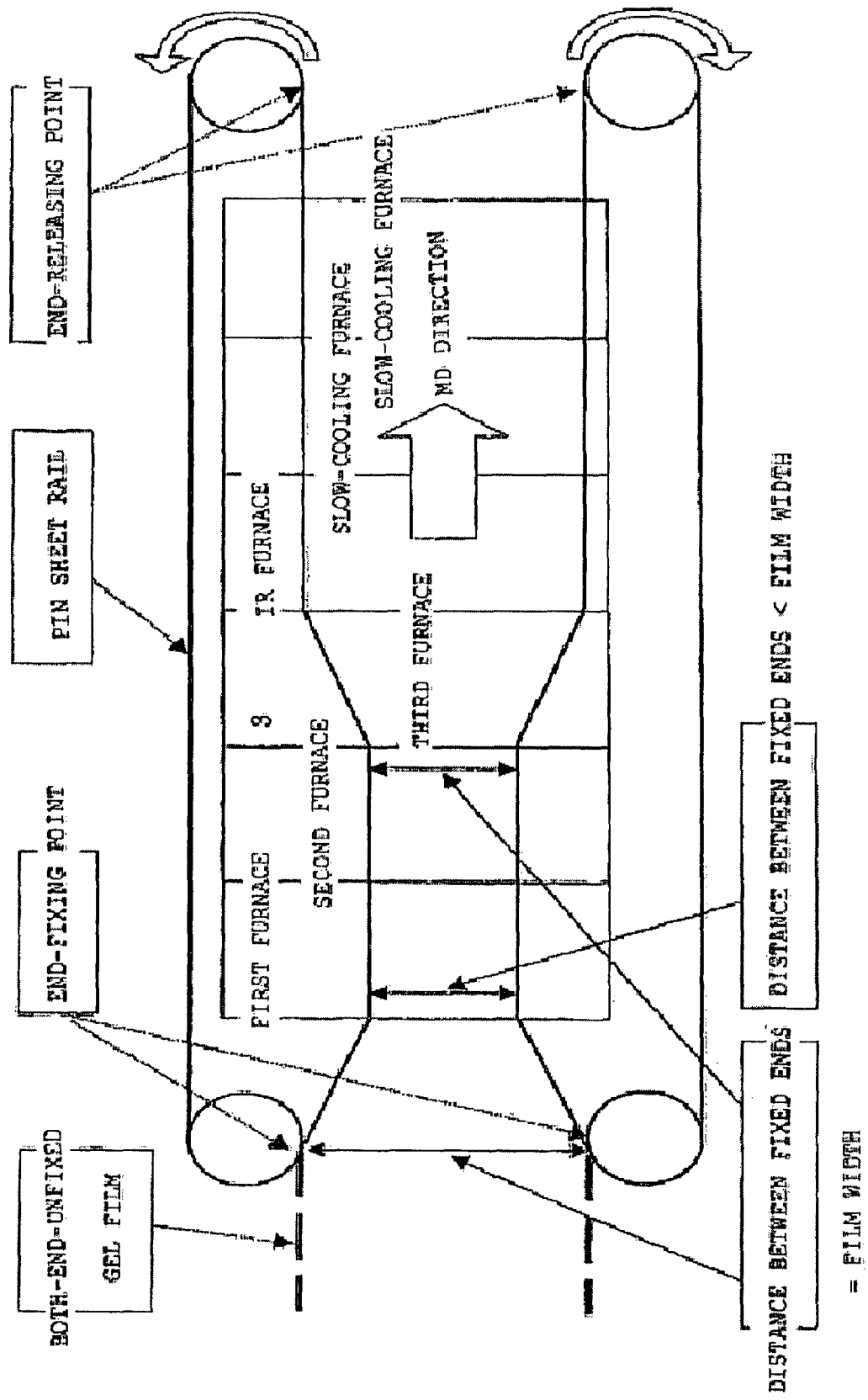
FIG. 4 TENTERING FURNACE AND DEGREE OF EXPANSION AND SHRINKAGE

ADHESIVE FILM, FLEXIBLE METAL-CLAD LAMINATE INCLUDING THE SAME WITH IMPROVED DIMENSIONAL STABILITY, AND PRODUCTION METHOD THEREFOR

TECHNICAL FIELD

The present invention relates to an adhesive film comprising a polyimide film and an adhesive layer containing a thermoplastic polyimide, the adhesive layer being disposed on at least one surface of the polyimide film; a flexible metal-clad laminate produced by laminating a metal foil to the adhesive film with a thermal roll laminator; and a production method therefor. More particularly, the invention relates to an adhesive film comprising a polyimide film formed by heating and transporting the film in a loose state in the width direction (hereinafter also referred to as the "TD direction") during film forming, and a flexible metal-clad laminate obtained by laminating a metal foil to the adhesive film with a thermal roll laminator, wherein preferably, the total of the ratio of change in dimensions before and after the removal of the metal foil and the ratio of change in dimensions before and after heating at 250° C. for 30 minutes of the laminate from which the metal foil has been removed is in a range of −0.06% to +0.06% both in the longitudinal direction (hereinafter also referred to as the "MD direction") and in the TD direction. The invention further relates to a production method therefor.

BACKGROUND ART

With the recent reduction in weight, miniaturization, and increase in density of electronic products, demands for various printed circuit boards have been increasing. In particular, demands for flexible printed circuit boards (also referred to as "FPCs") have been increasing. In general, a flexible printed circuit board has a structure in which a circuit composed of a metal foil is disposed on an insulating film.

A flexible metal-clad laminate constituting the flexible printed circuit board is usually produced by a method in which a metal foil is laminated by thermocompression bonding on a surface of a substrate made of a flexible insulating film with an adhesive material therebetween. As the insulating film, a polyimide film or the like is preferably used. As the adhesive material, a thermosetting adhesive, such as an epoxy or acrylic adhesive, is usually used (hereinafter, the FPC including such a thermosetting adhesive is also referred to as a "triple-layer FPC").

The thermosetting adhesive has an advantage in that bonding can be performed at relatively low temperatures. However, as the requirements for characteristics, such as heat resistance, flexibility, and electrical reliability, become more stringent, triple-layer FPCs including the thermosetting adhesive will have difficulties in meeting such requirements. On the other hand, a FPC in which a metal layer is directly disposed on an insulating film or in which a thermoplastic polyimide is used for an adhesive layer (hereinafter also referred to as a "double-layer FPC") has been proposed. The double-layer FPC has superior characteristics to those of the triple-layer FPC, and demands for the double-layer FPC are expected to increase.

Examples of the method for producing a flexible metal-clad laminate used for a double-layer FPC include a casting method in which a solution of a polyamic acid, i.e., a polyimide precursor, is cast and applied onto a metal foil, and then imidization is performed; a metallizing method in which a metal layer is directly disposed on a polyimide film by sputtering or plating; and a laminating method in which a polyimide film and a metal foil are laminated with a thermoplastic polyimide therebetween. Among these, the laminating method is superior because the laminating method can be used in the wider range of thickness of the metal foil than the casting method, and the equipment cost of the laminating method is lower than that of the metallizing method. As the lamination apparatus, a thermal roll laminator and a double belt press, or the like in which lamination is continuously performed while unreeling rolls of materials, is used. Among these, in view of productivity, the thermal roll laminating method can be more preferably used.

When the conventional triple-layer FPC is produced by the laminating method, since a thermosetting resin is used for the adhesive layer, lamination can be performed at a temperature less than 200° C. (refer to Japanese Unexamined Patent Application Publication No. 9-199830). In contrast, in the double-layer FPC, since a thermoplastic polyimide is used as an adhesive layer, in order to allow the thermoplastic polyimide to exhibit thermal fusibility, heat must be applied at a high temperature of 200° C. or more, and in some cases, about 400° C. Consequently, residual strain occurs in the flexible metal-clad laminate produced by lamination, resulting in changes in dimensions when interconnections are formed by etching and when solder reflow is performed in order to mount components. Therefore, in particular, when a flexible metal-clad laminate is produced by the laminating method, problems may be caused by changes in dimensions in the step of laminating a metal foil, the step of etching the metal foil, and the subsequent heating step.

Recently, in order to achieve miniaturization and weight reduction of electronic apparatuses, microfabricated wirings have been provided and miniaturized components having higher densities have been mounted on the boards. Therefore, if the change in dimensions increases after microfabricated wirings are formed, deviations occur from the component mounting positions originally designed, and thus the components are not connected satisfactorily to the boards.

Under these circumstances, attempts have been made to suppress the change in dimensions by controlling lamination pressure or by controlling tension of an adhesive film (refer to Japanese Unexamined Patent Application Publication No. 2002-326308 or 2002-326280). Although the change in dimensions is improved by such means, the improvement is not sufficient, and further improvement in the change in dimensions is desired.

DISCLOSURE OF INVENTION

The present invention has been achieved in view of the problems described above. It is an object of the present invention to provide an adhesive film which is used for producing, by a laminating method, a flexible metal-clad laminate in which the change in dimensions is suppressed, a flexible metal-clad laminate produced by laminating a metal foil to the adhesive film, and in particular, a flexible metal-clad laminate in which the change in dimensions is suppressed during the production by the laminating method, and to provide a method for producing the same.

In view of the problems described above, the present inventors have conducted intensive research. As a result, it has been uniquely found that, by using, as a core film, a polyimide film that is formed under specific conditions so as to be oriented in the MD direction, generation of thermal stress is suppressed during the imidization of the thermoplastic polyimide and during the lamination, and a change in dimensions can be effectively suppressed. Thereby, the present invention has been completed.

Namely, in a first aspect of the present invention, an adhesive film includes a polyimide film and an adhesive layer containing a thermoplastic polyimide, the adhesive layer being disposed on at least one surface of the polyimide film, wherein the polyimide film is formed by a process including:

step (A) of mixing a polyamic acid solution, a dehydrating agent, and an imidization catalyst, and casting and applying the mixture onto a support to form a gel film;

step (B) of stripping off the gel film and fixing both ends of the gel film; and step (C) of heating and transporting the film with both ends being fixed in a state loosened in the TD direction.

A preferred embodiment of the present invention relates to the adhesive film, in which the relationship $-15 \leq \theta \leq 15$ is satisfied at any position in the width direction of the film (TD direction), wherein $\theta(°)$ is the angle of molecular orientation axis to the MD direction of the polyimide film.

A more preferred embodiment of the present invention relates to the adhesive film, in which the relationships $2 \leq \alpha_1 \leq 10$, $13 \leq \alpha_2 \leq 25$, and $20 \leq (\alpha_1 + \alpha_2) \leq 40$ are satisfied, wherein $\alpha_1$ (ppm/° C.) is the coefficient of linear expansion (200° C. to 300° C.) of the polyimide film in the MD direction, and $\alpha_2$ (ppm/° C.) is the coefficient of linear expansion (200° C. to 300° C.) of the polyimide film in the TD direction.

In a second aspect of the present invention, a flexible metal-clad laminate includes the adhesive film and a metal foil laminated to the adhesive film with a thermal roll laminator including at least one pair of metal rollers.

A preferred embodiment of the present invention relates to the flexible metal-clad laminate, in which the total of the ratio of change in dimensions before and after the removal of the metal foil and the ratio of change in dimensions before and after heating at 250° C. for 30 minutes of the laminate from which the metal foil has been removed is in a range of −0.06% to +0.06% both in the MD direction and in the TD direction.

In a third aspect of the present invention, a method for producing an adhesive film including a polyimide film and an adhesive layer containing a thermoplastic polyimide, the adhesive layer being disposed on at least one surface of the polyimide film, the method including forming the polyimide film by a process including:

step (A) of mixing a polyamic acid solution, a dehydrating agent, and an imidization catalyst, and casting and applying the mixture onto a support to form a gel film;

step (B) of stripping off the gel film and fixing both ends of the gel film; and step (C) of heating and transporting the film with both ends being fixed in a state loosened in the TD direction.

In the flexible metal-clad laminate of the present invention, a change in dimensions is suppressed, and in particular, a change in dimensions in the laminating method can be effectively suppressed. Specifically, the total of the ratio of change in dimensions before and after the removal of the metal foil and the ratio of change in dimensions before and after heating at 250° C. for 30 minutes of the laminate from which the metal foil has been removed can be set in a range of −0.06% to +0.06% both in the MD direction and in the TD direction. Consequently, the flexible metal-clad laminate can be suitably used for FPCs and the like that are provided with microfabricated wirings and problems, such as positional deviations, can be overcome.

BRIEF DESCRIPTION OF THE DRAWINGS

FIG. 1 is a diagram showing images of cross-sections of films in a loosened state.

FIG. 3 is a diagram showing the sampling positions for the angle of molecular orientation axis.

FIG. 4 is a diagram showing a tentering furnace and the degree of expansion and shrinkage.

BEST MODE FOR CARRYING OUT THE INVENTION

Figure 2:
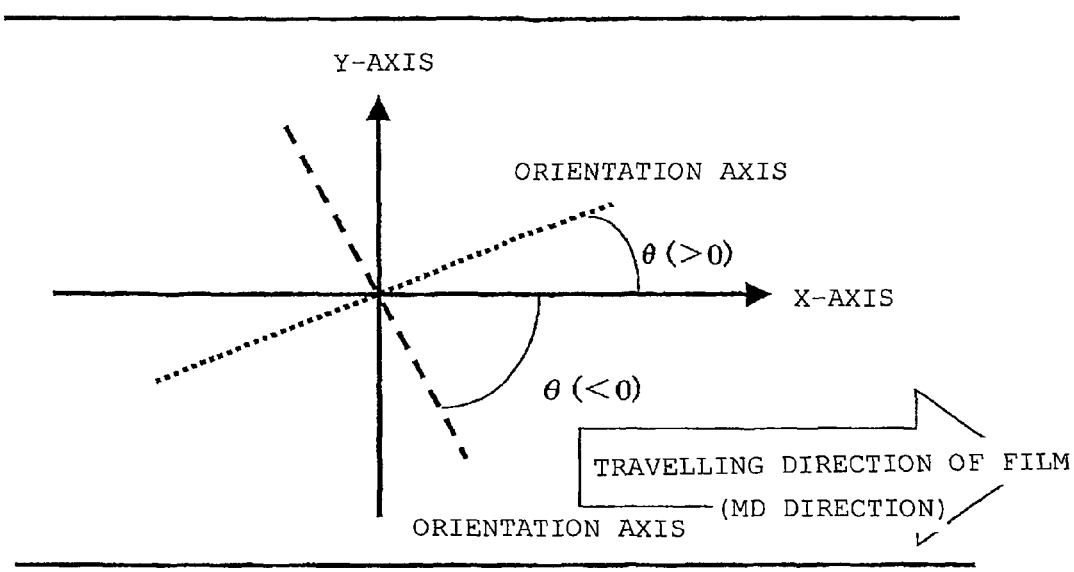
FIG. 2 is a diagram illustrating measurement of molecular orientation of a film.

An adhesive film of the present invention includes a polyimide film and an adhesive layer containing a thermoplastic polyimide, the adhesive layer being disposed on at least one surface of the polyimide film, wherein the polyimide film is formed by a process including step (A) of casting and applying a solution containing a polyamic acid onto a support to form a gel film, step (B) of stripping off the gel film and fixing both ends of the gel film, and step (C) of heating and transporting the film with both ends being fixed. In at least a portion of step (C), the film is transported in a loose state in the TD direction.

A change in dimensions particularly is a problem when an adhesive film including a polyimide film and an adhesive layer containing a thermoplastic polyimide, the adhesive layer being disposed on at least one surface of the polyimide film, is bonded to a metal foil by a thermal lamination method. The adhesive layer containing the thermoplastic polyimide is disposed on the polyimide film by any one of several methods. In particular, in a method in which after a solution containing a polyamic acid, i.e., a precursor to a thermoplastic polyimide, is cast and applied, imidization is performed by continuous heating, besides heating for imidization, heat and pressure are continuously applied when the metal foil is bonded to the adhesive film. Thus, the material is often placed in a heating environment under tension. Therefore, different thermal stresses occur in the MD direction (machine direction, longitudinal direction) and in the TD direction (width direction). Specifically, tensile force is generated in the MD direction in which tension is applied, whereas shrinking force is generated in the TD direction. As a result, when the metal foil is removed from the flexible laminate by etching and when heating is performed during solder reflowing, the stresses are relieved, resulting in shrinkage in the MD direction and expansion in the TD direction.

The present inventors have found that by using a polyimide film produced by a specific production process as the polyimide film for the adhesive film, a change in dimensions occurring, in particular, due to bonding to the metal foil by a thermal lamination method can be suppressed.

That is, by using, as the polyimide film, a polyimide film produced by a process including step (A) of casting and applying a solution containing a polyamic acid onto a support to form a gel film, step (B) of stripping off the gel film and fixing both ends of the gel film, and step (C) of heating and transporting the film with both ends being fixed, wherein in at least a portion of step (C), the film is transported in a loose state in the TD direction, even if different thermal stresses occur in the MD direction and in the TD direction, it is possible to offset strains, and thus a change in dimensions can be suppressed.

Embodiments of the present invention will be described below, with respect to the polyimide film, the adhesive layer, production of the adhesive film, and the flexible metal-clad laminate in that order.

(Polyimide Film)

The polyimide film of the present invention is produced from a solution of a polyamic acid which is a precursor to the polyimide. The polyamic acid, i.e., the precursor to the polyimide, used in the present invention can be prepared by any known method, and usually by a method in which substantially equimolar amounts of an aromatic acid dianhydride and an aromatic diamine are dissolved in an organic solvent, and the resulting organic solvent solution containing a polyamic acid is stirred under a controlled temperature until the polymerization between the acid dianhydride and the diamine is completed. The resulting polyamic acid solution usually has a concentration of 5% to 35% by weight, and preferably 10% to 30% by weight. In this range of concentration, a suitable molecular weight and solution viscosity can be obtained.

As the polymerization method, any known method or a combination of known methods may be used. The polymerization method for a polyamic acid is characterized by the order of addition of monomers, and by controlling the order of addition of monomers, the physical properties of the resulting polyimide can be controlled. Consequently, in the present invention, any method for adding monomers may be used in the polymerization for polyamic acid. Examples of typical polymerization methods include:

1) a polymerization method in which an aromatic diamine is dissolved in a polar organic solvent, and then is allowed to react with a substantially equimolar amount of an aromatic tetracarboxylic dianhydride;
2) a polymerization method in which an aromatic tetracarboxylic dianhydride is allowed to react with a less than equimolar amount of an aromatic diamine compound in a polar organic solvent to form a prepolymer containing acid anhydride groups at both termini, and then the aromatic diamine compound is added so that the total amount of aromatic diamine compound is substantially equimolar to the amount of the aromatic tetracarboxylic dianhydride;
3) a polymerization method in which an aromatic tetracarboxylic dianhydride is allowed to react with an excessive molar amount of an aromatic diamine compound in a polar organic solvent to form a prepolymer containing amino groups at both termini, the aromatic diamine compound is further added, and then the aromatic tetracarboxylic dianhydride is added so that the total amount of aromatic tetracarboxylic dianhydride is substantially equimolar to the amount of the aromatic diamine compound;
4) a polymerization method in which an aromatic tetracarboxylic dianhydride is dissolved and/or dispersed in a polar organic solvent, and then is allowed to react with a substantially equimolar amount of an aromatic diamine compound; and
5) a polymerization method in which a mixture of substantially equimolar amounts of an aromatic tetracarboxylic dianhydride and an aromatic diamine are allowed to react in a polar organic solvent.

These methods may be used alone or partially combined.

In the present invention, a polyamic acid prepared by any one of the polymerization methods described above may be used, and the polymerization method is not particularly limited.

In order to produce a polyimide film having physical properties suitable for use in the adhesive film of the present invention, preferably, a polymerization method is used in which a prepolymer is prepared using a diamine component having a rigid structure, such as para-phenylenediamine or substituted benzidine. By using this method, a polyimide film having a high modulus of elasticity and a low coefficient of hygroscopic expansion can be easily produced. In this method, the molar ratio between a diamine having a rigid structure and an acid dianhydride is preferably in a range of 100:70 to 100:99 or 70:100 to 99:100, and more preferably in a range of 100:75 to 100:90 or 75:100 to 90:100. If the ratio is below the above range, there will be a difficulty in obtaining the effect of improving the modulus of elasticity and the coefficient of hygroscopic expansion. If the ratio exceeds the above range, problems may arise, such as an excessively low coefficient of thermal expansion and a small tensile elongation.

Materials used for the polyamic acid composition according to the present invention will now be described.

Examples of the acid dianhydride which may be appropriately used in the present invention include pyromellitic dianhydride, 2,3,6,7-naphthalenetetracarboxylic dianhydride, 3,3',4,4'-biphenyltetracarboxylic dianhydride, 1,2,5,6-naphthalenetetracarboxylic dianhydride, 2,2',3,3'-biphenyltetracarboxylic dianhydride, 3,3',4,4'-benzophenonetetracarboxylic dianhydride, 4,4'-oxyphthalic dianhydride, 2,2-bis(3,4-dicarboxyphenyl)propane dianhydride, 3,4,9,10-perylenetetracarboxylic dianhydride, bis(3,4-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)ethane dianhydride, oxydiphthalic dianhydride, bis(3,4-dicarboxyphenyl) sulfone dianhydride, p-phenylenebis(trimellitic acid monoester anhydride), ethylenebis(trimellitic acid monoester anhydride), bisphenol A bis(trimellitic acid monoester anhydride), and analogs thereof. These may be used alone or in combination of two or more.

Among these acid dianhydrides, in particular, use of at least one selected from pyromellitic dianhydride, 3,3',4,4'-benzophenonetetracarboxylic dianhydride, 3,3',4,4'-oxyphthalic dianhydride, and 3,3',4,4'-biphenyltetracarboxylic dianhydride is preferable.

Among these acid dianhydrides, the amount of use of at least one selected from 3,3',4,4'-benzophenonetetracarboxylic dianhydride, 4,4'-oxyphthalic dianhydride, and 3,3',4,4'-biphenyltetracarboxylic dianhydride is preferably 60 mole percent or less, more preferably 55 mole percent or less, and still more preferably 50 mole percent or less relative to the total acid dianhydride component. If the amount of use of at least one selected from 3,3',4,4'-benzophenonetetracarboxylic dianhydride, 4,4'-oxyphthalic dianhydride, and 3,3',4,4'-biphenyltetracarboxylic dianhydride exceeds the above range, the glass transition temperature of the resulting polyimide film may become excessively low, or the storage modulus during heating may become excessively low, resulting in a difficulty in forming a film itself.

Furthermore, when pyromellitic dianhydride is used, the amount of use is preferably 40 to 100 mole percent, more preferably 45 to 100 mole percent, and most preferably 50 to 100 mole percent. By using pyromellitic dianhydride in the above range, the glass transition temperature and the storage modulus during heating can be easily maintained in the suitable range for use or film formation.

Examples of the diamine which may be appropriately used for the polyamic acid, i.e., polyimide precursor, according to the present invention include 4,4'-diaminodiphenylpropane, 4,4'-diaminodiphenylmethane, benzidine, 3,3'-dichlorobenzidine, 3,3'-dimethylbenzidine, 2,2'-dimethylbenzidine, 3,3'-dimethoxybenzidine, 2,2'-dimethoxybenzidine, 4,4'-diaminodiphenyl sulfide, 3,3'-diaminodiphenyl sulfone, 4,4'-diaminodiphenyl sulfone, 4,4'-oxydianiline, 3,3'-oxydianiline, 3,4'-oxydianiline, 1,5-diaminonaphthalene, 4,4'-diaminodiphenyldiethylsilane, 4,4'-diaminodiphenylsilane, 4,4'-diaminodiphenylethylphosphine oxide, 4,4'-diaminodiphenyl N-methylamine, 4,4'-diaminodiphenyl N-phenylamine, 1,4-diaminobenzene(p-phenylenediamine), 1,3-diaminobenzene, 1,2-diaminobenzene, bis{4-(4-aminophenoxy)phenyl}sulfone, bis{4-(3-aminophenoxy)phenyl}sulfone, 4,4'-bis(4-aminophenoxy)biphenyl, 4,4'-bis(3-aminophenoxy)biphenyl, 1,3-bis(3-aminophenoxy)benzene, 1,3-bis(4-aminophenoxy)benzene, 1,3-bis(4-aminophenoxy)benzene, 1,3-bis(3-aminophenoxy)benzene, 3,3'-diaminobenzophenone, 4,4'-diaminobenzophenone, and analogs thereof.

When these diamines are classified into rigid structure-containing diamines, for example, diaminobenzenes and benzidines, and diamines having a soft structure, such as an ether group, a sulfone group, a ketone group, or a sulfide group, the molar ratio of the rigid structure-containing diamine to the soft structure-containing diamine to be used is 80/20 to 20/80, preferably 70/30 to 30/70, and more preferably 60/40 to 30/70. If the ratio of the rigid structure-containing diamine to be used exceeds the above range, the tensile elongation of the resulting film tends to be decreased. If the ratio of the rigid structure-containing diamine is below the above range, the glass transition temperature may become excessively low or the storage modulus may become excessively low during heating, resulting in a difficulty in forming a film, which is undesirable.

The polyimide film used in the present invention can be produced by appropriately selecting the types and compounding ratio of the aromatic acid dianhydride and the aromatic diamine within the ranges described above so that the resulting film has desired properties.

Any solvent that dissolves the polyamic acid can be used for the synthesis of the polyamic acid. Examples of the solvent include amide solvents, such as N,N-dimethylformamide, N,N-dimethylacetamide, and N-methyl-2-pyrrolidone. Among them, N,N-dimethylformamide and N,N-dimethylacetamide can be particularly preferably used.

Furthermore, in order to improve various properties of the film, such as slidability, thermal conductivity, electric conductivity, corona durability, and loop stiffness, a filler may be incorporated. Any filler may be used. Preferred examples of the filler include silica, titanium oxide, alumina, silicon nitride, boron nitride, calcium hydrogenphosphate, calcium phosphate, and mica.

The particle size of the filler depends on the properties of the film to be modified and the type of filler to be added, and is not particularly limited. In general, the average particle size is 0.05 to 100 μm, preferably 0.1 to 75 μm, more preferably 0.1 to 50 μm, and most preferably 0.1 to 25 μm. If the particle size is below the above range, the modification effect is not easily exhibited. If the particle size exceeds the above range, surface properties may be greatly degraded or mechanical characteristics may be greatly decreased. The amount of the filler to be used also depends on the properties of the film to be modified, the particle size of the filler, etc., and is not particularly limited. In general, the filler is used in an amount of 0.01 to 100 parts by weight, preferably 0.01 to 90 parts by weight, and more preferably 0.02 to 80 parts by weight based on 100 parts by weight of the polyimide. If the amount of the filler is below the above range, the modification effect is not easily exhibited. If the amount of the filler exceeds the above range, the mechanical characteristics of the film may be greatly impaired. The filler may be incorporated by any method, such as method 1 in which the filler is added to the polymerization reaction solution before or during the polymerization, method 2 in which the filler is mixed using a three-roll mill or the like after the polymerization is completed, or method 3 in which a dispersion liquid containing the filler is prepared and the dispersion liquid is mixed into an organic solvent solution of polyamic acid. The method in which the dispersion liquid containing the filler is mixed into the polyamic acid solution, in particular, immediately before the film formation, is preferable because of the least pollution of the production line with the filler. When the dispersion liquid containing the filler is prepared, preferably, the same solvent as the solvent used for polymerization of polyamic acid is used. Furthermore, in order to disperse the filler satisfactorily and to stabilize the dispersion state, a dispersant, a thickening agent, etc., may be used to such an extent that does not affect physical properties of the film.

In order to convert the polyamic acid solution into a polyimide, any known method may be used. Examples of the method include a thermal imidization method and a chemical imidization method. In the thermal imidization method, imidization is accelerated only by heating without using the dehydrating agent and the imidization catalyst. The heating conditions vary depending on the type of polyamic acid, the thickness of the film, etc. In the chemical imidization method, the organic solvent solution of polyamic acid is treated with the dehydrating agent and the imidization catalyst. Examples of the dehydrating agent include aliphatic acid anhydrides, such as acetic anhydride; and aromatic acid anhydrides, such as benzoic anhydride. Examples of the imidization catalyst include aliphatic tertiary amines, such as triethylamine; aromatic tertiary amines, such as dimethylaniline; and heterocyclic tertiary amines, such as pyridine, picoline, and isoquinoline. Among these, in particular, acetic anhydride is preferable as the dehydrating agent, and isoquinoline is preferable as the imidization catalyst. In order to obtain an excellent polyimide film, 1.0 to 4.0 moles, preferably 1.2 to 3.5 moles, and more preferably 1.5 to 2.5 moles of the dehydrating agent is added per mole of amic acid in the organic solvent solution containing polyamic acid, and 0.1 to 2.0 moles, preferably 0.2 to 1.5 moles, more preferably 0.3 to 1.2 moles, most preferably 0.3 to 1.1 moles of the imidization catalyst is added per mole of amic acid in the organic solvent solution containing polyamic acid.

With respect to an adhesive film according to the present invention, in order to form a polyimide film, i.e., a core, steps (A) to (C) described below are carried out, and thereby the resulting polyimide film is oriented in the MD direction. When a metal foil is laminated to the adhesive film by a thermal lamination method, the difference between a thermal stress occurring in the MD direction and a thermal stress occurring in the TD direction of the adhesive film is suppressed, and a flexible metal-clad laminate in which a change in dimensions is suppressed can be obtained. In particular, when an adhesive layer is provided by a method in which a solution of polyamic acid, i.e., a precursor to a thermoplastic polyimide, is cast and applied onto at least one surface of a polyimide film, and then imidization is performed by continuous heating, a change in dimensions can be effectively suppressed during imidization of the thermoplastic polyimide and during lamination of a metal foil using a thermal lamination method. Thus, a particularly remarkable effect is shown.

Step (A) of casting and applying a solution containing a polyamic acid onto a support to form a gel film Step (B) of stripping off the gel film and fixing both ends of the gel film Step (C) of heating and transporting the film with both ends being fixed In step (C), it is important that the film be at least for a time transported in a state loosened in the TD direction.

In step (A), the organic solvent in which the polyamic acid is dissolved, the imidization catalyst, the dehydrating agent, and the reaction products (water-absorbing component of the dehydrating agent, water) remain as residual components in the gel film. In step (A), the residual component ratio in the gel film is preferably 5% to 200%, and more preferably 10% to 100%. Herein, the residual component ratio in the gel film is calculated according to the expression below.

Residual component ratio in gel film (%)=[(residual component weight in gel film)/(solid polyimide weight)]×100

The solid polyimide weight means the weight of completely dried gel film.

The weight a of completely dried gel film and the residual component weight b are determined as follows. After the weight d of a 100 mm×100 mm gel film is measured, the gel film is dried in an oven at 450° C. for 20 minutes and cooled to room temperature. The weight measured at this stage is defined as the completely dried solid weight a. The residual component weight b is calculated based on the gel film weight d and the completely dried solid weight a according to the expression b=d−a.

When both ends of the film are fixed in step (B), preferably, substantially no tension is applied in the width direction of the film.

When the film is at least for a time transported in a state loosened in the TD direction in step (C), the loosened state means that except for the tension due to its own weight, tensile force due to mechanical handling is not applied to the film in the TD direction. Namely, the film width between both end-fixing points is longer than the distance between the fixed ends of the film.

Usually, a film is tight with tension, and the distance between the fixed ends of the film is equal to the film width between both end-fixing points. In the present invention, as shown in FIG. 1, the distance between the fixed ends of the film is different from the film width, the distance between the fixed ends of the film being smaller. Specifically, the film is fixed in a loosened state. In particular, from the standpoint that the molecular orientation in the MD direction is easily controlled, the film is fixed so that the distance X between the fixed ends of the film and the film width Y between both end-fixing points satisfy the expression below.

$$-20.0 \leq (X-Y)/Y \times 100 < 0.00$$

If the value (X−Y)/Y×100 (for the sake of convenience, also referred to as the "TD shrinkage rate") is below the above range, it may become difficult to stably control the looseness of the film, resulting in a variation in the amount of looseness with respect to the travelling direction. Furthermore, depending on the case, the film may become unfastened from the end-fixing device, and stable production of the film may become difficult. More preferably, $-10.0 \leq (X-Y)/Y \times 100 < 0.00$, and particularly preferably, $-5.0 \leq (X-Y)/Y \times 100 < 0.00$.

Step (C) may include a process of stretching the film in the TD direction.

In the process of stretching the film in the TD direction according to the present invention, the film which has been transported in the loosened state is stretched in the TD direction in a heating furnace. If the film which has been transported in the loosened state is heated in the heating furnace, the film shrinks to a certain extent. After the looseness of the film disappears due to shrinkage, the film is stretched in the TD direction. The amount of stretching (for the sake of convenience, also referred to as the "expansion rate") preferably satisfies the expression below, wherein B is the width between end-fixing points in the TD direction before stretching of the film, and C is the width between end-fixing points after the film is stretched in the TD direction.

$$20.0 \geq (C-B)/B \times 100 > 0.00$$

If the value (C−B)/B×100 exceeds the above range, it may become difficult to control the molecular orientation axis in the MD direction. More preferably, $10.0 \geq (C-B)/B \times 100 > 0.00$, and particularly preferably, $5.0 \geq (C-B)/B \times 100 > 0.00$.

In this process, the film is stretched in the TD direction while the distance between the end-fixing points of the film is gradually increased. Furthermore, as required, after this process, the film may be transported in a loosened state again, and the film width may be further increased. Preferably, the amount of shrinkage and the amount of expansion are selected appropriately.

In step (C), the temperature of a first heating furnace into which the gel film is carried is preferably set in a range of 100° C. to 300° C. A first heating time is preferably set in a range of 10 to 600 seconds. By setting the heating temperature and time in the ranges described above, it is possible to adjust the gel film so that the orientation is easily controlled.

Preferably, the loosened state in the TD direction is achieved before the film is carried into the heating furnace. Alternatively, the loosened state is achieved when both ends of the film are fixed (i.e., both ends are fixed so that the film is loosened in the TD direction). Images of cross-sections of films are shown in FIG. 1.

A heating method that is preferably used in step (C) will be described below. Preferably, the gel film is heated in a hot-air heating furnace, and then is continuously heated in a far-infrared furnace. Furthermore, the hot-air heating furnace preferably includes at least two furnaces so that heating can be performed in stages. The reason for this is that if the film is heated in a far-infrared furnace immediately after being heated by one hot-air heating furnace, the film shrinks in the far-infrared furnace regardless of the heating and residence time in the hot-air heating furnace, which is unsuitable for controlling orientation.

By the heating treatment, polyimide molecules are oriented in the MD direction in the resulting polyimide film. The angle of molecular orientation axis (θ) to the MD direction of the film is not necessarily limited. Preferably, the relationship $-15° \leq \theta \leq 15°$ is satisfied at any position in the TD direction. If the angle θ of molecular orientation axis to the MD direction of the film is out of the above range, in some cases, orientation may become insufficient, and the effect of suppressing the change in dimensions may not be easily exhibited. In order to sufficiently exhibit the effect of suppressing the change in dimensions, preferably $-15° \leq \theta \leq 15°$, more preferably $-10° \leq \theta \leq 10°$, and most preferably $-5° \leq \theta \leq 5°$. In order to check if the relationship $-15° \leq \theta \leq 15°$ is satisfied at any position in the TD direction, samples are taken from at least five points, including both ends, spaced at an equal interval. In this method, although the entire portion in the TD direction is not measured, if all the samples thus taken satisfy the relationship $-15° \leq \theta \leq 15°$, it can be considered that the relationship $-15° \leq \theta \leq 15°$ is satisfied at any position measured in the TD direction.

Furthermore, the angle of molecular orientation axis means an angle between the reference axis and the orientation axis of the polyimide molecular chain. For example, when the angle θ of molecular orientation axis to the MD direction of the film is 0°, the molecular orientation axis corresponds to the MD direction of the film.

By the heating treatment, the coefficient of linear expansion of the resulting polyimide film is also changed. Preferably, the relationships $2 \leq \alpha_1 \leq 10$, $13 \leq \alpha_2 \leq 25$, and $20 \leq (\alpha_1 + \alpha_2) \leq 40$ are satisfied, wherein $\alpha_1$ (ppm/° C.) is the coefficient of linear expansion (200° C. to 300° C.) of the polyimide film in the MD direction, and $\alpha_2$ (ppm/° C.) is the coefficient of linear expansion (200° C. to 300° C.) of the polyimide film in the TD direction. The coefficient of linear expansion is specified at 200° C. to 300° C. in view of particular importance of the behavior in the range of 200° C. to 300° C. Namely, when the polyimide film is used in combination with an adhesive layer having excellent heat resistance (e.g., adhesive layer composed of a resin with a glass transition temperature of 200° C. or more), at 300° C. or more, the adhesive layer is in a substantially fused state (i.e., the influence of expansion and shrinkage of the adhesive layer is substantially negligible), whereas at less than 300° C., fusibility of the adhesive layer is decreased (the influence of expansion and shrinkage of the adhesive layer becomes non-negligible), and further at less than 200° C., the adhesive layer is substantially fixed (behavior of expansion and shrinkage substantially stops). If the values $\alpha_1$ and $\alpha_2$ are out of the above ranges, for example, in some cases, the influence of tension during thermal lamination cannot be reduced sufficiently, and the effect of suppressing the change in dimensions may be decreased. If the value $(\alpha_1 + \alpha_2)$ is out of the above range, the orientation in the film thickness direction (in the z-axis direction) may greatly vary, the effect of suppressing the change in dimensions may not be exhibited, and the other physical properties may also be degraded.

(Adhesive Film)

Examples of the thermoplastic polyimide which is preferably used for the adhesive layer of the adhesive film of the present invention include thermoplastic polyimides, thermoplastic polyamide-imides, thermoplastic polyetherimides, and thermoplastic polyesterimides. Among these, in view of low water absorption, thermoplastic polyesterimides are particularly preferably used.

From the standpoints that lamination can be performed with an existing apparatus and that heat resistance of the resulting metal-clad laminate is not degraded, the thermoplastic polyimide of the present invention preferably has a glass transition temperature (Tg) in a range of 150° C. to 300° C. Additionally, the Tg can be determined from the inflection point of the storage modulus measured by a dynamic viscoelasticity analyzer (DMA).

The polyamic acid, which is a precursor to the thermoplastic polyimide, is not particularly limited, and any known polyamic acid may be used. The preparation thereof may be performed using known starting materials, reaction conditions, etc. (for example, refer to Examples which will be described later). As necessary, an inorganic or organic filler may be incorporated.

(Production of Adhesive Film)

The adhesive film used for the production of the flexible metal-clad laminate of the present invention is formed by disposing an adhesive layer containing a thermoplastic polyimide on at least one surface of the insulating film. Examples of the method for forming the adhesive film include a method in which an adhesive layer is formed on a polyimide film serving as a base film, and a method in which an adhesive layer is formed into a sheet, and the resulting sheet is bonded to the base film. Among these, when the former method is employed, if a polyamic acid, which is a precursor to the thermoplastic polyimide contained in the adhesive layer, is completely imidized, in some case, the solubility in an organic solvent may decrease, and thus it may become difficult to provide the adhesive layer on the base film. From this standpoint, more preferably, a solution containing a polyamic acid, which is a precursor to the thermoplastic polyimide, is prepared, the solution is applied to the base film, and then imidization is performed. The imidization may be performed by a thermal cure method or a chemical cure method.

In either one of the imidization methods, heating is performed so that imidization takes place efficiently. The temperature during the imidization is set preferably in a range of (glass transition temperature of thermoplastic polyimide minus 100° C.) to (glass transition temperature plus 200° C.), and more preferably in a range of (glass transition temperature of thermoplastic polyimide minus 50° C.) to (glass transition temperature plus 150° C.). As the curing temperature is increased, imidization takes place more easily, and the curing rate can be increased, which is desirable in view of productivity. However, if the curing temperature is excessively high, the thermoplastic polyimide may be thermally decomposed. If the curing temperature is excessively low, imidization does not easily take place even if the chemical cure method is employed, and the curing step requires a longer period of time.

The imidization time is not particularly limited, and a time sufficient for substantially completing imidization and drying is selected. In general, the imidization time is appropriately set in a range of about 1 to 600 seconds. Furthermore, in order to improve fusibility and flowability of the adhesive layer, intentionally, the imidization ratio may be decreased and/or the solvent may be allowed to remain.

The tension applied during imidization is preferably in a range of 1 kg/m to 15 kg/m, and more preferably in a range of 5 kg/m to 10 kg/m. If the tension is lower than the above range, sagging may occur during the transportation of the film, resulting in a difficulty in winding the film Uniformly, or the like. If the tension is higher than the above range, since heating is performed at high temperatures with the adhesive film being applied with a high tension, even if the core film is oriented in the MD direction, a thermal stress may occur in the adhesive film, thus affecting the change in dimensions.

The method for casting and applying the polyamic acid solution onto the base film is not particularly limited, and a known method using a die coater, a reverse coater, a blade coater, or the like may be used.

Furthermore, the polyamic acid solution may contain other materials, such as a filler, depending on the application. The thicknesses of the individual layers in the heat-resistant adhesive film may be appropriately adjusted so as to achieve the total thickness required in the application. As necessary, various types of surface treatment, such as corona treatment, plasma treatment, and coupling treatment, may be performed on the surface of the core film.

(Production of Flexible Metal-Clad Laminate)

A flexible metal-clad laminate of the present invention is produced by bonding a metal foil to the adhesive film. The metal foil is not particularly limited. When the flexible metal-clad laminate of the present invention is used in electronic device and electrical device applications, examples of the metal foil which may be used include foils composed of copper or copper alloys, stainless steel or alloys thereof, nickel or nickel alloys (including 42 alloys), and aluminum or aluminum alloys. Copper foils, such as rolled copper foils and electrolytic copper foils, are generally used for flexible metal-clad laminates. Such copper foils can also be preferably used in the present invention. Additionally, a rust preventive layer, a heat-resistant layer, or an adhesive layer may be provided by coating on the surface of the metal foil.

In the present invention, the thickness of the metal foil is not particularly limited, and the metal foil may be of any thickness as long as its function can be carried out satisfactorily according to the application. As the method for bonding the adhesive film and the metal foil, for example, continuous treatment may be performed using a thermal roll laminator including at least one pair of metal rollers or a double belt press (DBP). Above all, from the standpoint that the structure of the apparatus is simple, thus being advantageous in maintenance cost, use of a thermal roll laminator including at least one pair of metal rollers is preferable. As the "thermal roll laminator including at least one pair of metal rollers", any apparatus including metal rollers for applying heat and pressure is acceptable, and the structure of the apparatus is not particularly limited.

Although the specific structure of the thermal laminating means is not particularly limited, in order to improve the appearance of the resulting laminate, preferably, a protective material is disposed between the pressure-applying surface and the metal foil. As the protective material, any material that withstands the heating temperature in the thermal lamination step may be used without limitations, and for example, a heat-resistant plastic, such as a non-thermoplastic polyimide film; or a metal foil, such as a copper foil, an aluminum foil, or a SUS foil, can be preferably used. In particular, in view of excellent balance between heat resistance, reusability, etc., a non-thermoplastic polyimide film is more preferably used. Furthermore, if the thickness is small, it is not possible to carry out the function of buffering and protection sufficiently. Therefore, preferably, the non-thermoplastic polyimide film has a thickness of 75 μm or more.

The protective material is not necessarily a single-layer film, and may be a multi-layer film having two or more layers with different characteristics.

In the thermal laminating means, the method for heating the materials to be laminated is not particularly limited, and heating means that uses a known method capable of heating at a predetermined temperature, such as a heat medium circulation method, a hot-air heating method, or an induction heating method, may be employed. Similarly, the method for applying pressure to the materials to be laminated in the thermal laminating means is not particularly limited. For example, pressurizing means using a known method capable of applying a predetermined pressure, such as a hydraulic method, a pneumatic method, or a gap pressure method, may be employed.

The heating temperature in the lamination step, i.e., the laminating temperature, is preferably equal to or higher than the glass transition temperature (Tg) of the adhesive film plus 50° C., and more preferably equal to or high than the glass transition temperature (Tg) of the adhesive film plus 100° C. If the laminating temperature is equal to or higher than Tg plus 50° C., the adhesive film and the metal foil can be thermally laminated to each other satisfactorily. If the laminating temperature is equal to or higher than Tg plus 100° C., the laminating rate is increased and productivity can be further improved.

In the thermal lamination step, the laminating rate is preferably 0.5 m/min or more, and more preferably 1.0 m/min or more. If the laminating rate is 0.5 m/min or more, satisfactory thermal lamination is enabled. If the laminating rate is 1.0 m/min or more, productivity can be further improved.

As the pressure in the thermal lamination step, i.e., the lamination pressure, is increased, the laminating temperature can be decreased and the laminating rate can be increased. However, in general, if the lamination pressure is excessively high, the change in dimensions of the resulting laminate tends to increase, whereas if the lamination pressure is excessively low, the adhesion strength of the metal foil of the resulting laminate is decreased. Consequently, the lamination pressure is preferably in a range of 49 to 490 N/cm (5 to 50 kgf/cm), and more preferably in a range of 98 to 294 N/cm (10 to 30 kgf/cm). Within the above range, the three conditions, i.e., the laminating temperature, the laminating rate, and the lamination pressure, can be set satisfactorily, and productivity can be further improved.

The tension of the adhesive film in the lamination step is preferably 0.01 to 4 N/cm, more preferably 0.02 to 2.5 N/cm, and most preferably 0.05 to 1.5 N/cm. If the tension is below the above range, sagging and meandering may occur during the transportation of the laminate, and the laminate may not be fed uniformly to the heating roller, resulting in a difficulty in producing a flexible metal-clad laminate having excellent appearance. If the tension exceeds the above range, the influence of the tension may become strong to an extent that cannot be reduced by controlling the Tg and the storage modulus of the adhesive layer, resulting in a degradation in dimensional stability.

In order to produce a flexible metal-clad laminate according to the present invention, preferably, a thermal laminator in which materials to be laminated are continuously compression-bonded under heating is used. In the thermal laminator, lamination material-feeding means for feeding lamination materials may be provided in the stage preliminary to the thermal lamination means, and lamination material-winding means for winding the lamination materials may be provided in the stage subsequent to the thermal lamination means. By providing those means, the productivity of the thermal laminator can be further improved. The specific structures of the material-feeding means and the material-winding means are not particularly limited. For example, known roll winders capable of winding the adhesive film, the metal foil, or the resulting laminate may be used.

Furthermore, more preferably, protective material-winding means and protective material-feeding means for winding or feeding the protective material are provided. If the protective material-winding means and protective material-feeding means are provided, by winding the protective material used in the thermal lamination step and placing it again on the feeding-side, the protective material can be reused. Furthermore, in order to align both edges of the protective material when the protective material is wound, edge position-detecting means and winding position-correcting means may be provided. By those means, since winding can be performed with the edges of the protective material being accurately aligned, the efficiency of reuse can be enhanced. The specific structures of the protective material-winding means, the protective material-feeding means, the edge position-detecting means, and the winding position-correcting means are not particularly limited, and known devices may be used.

In the flexible metal-clad laminate produced by the method according to the present invention, extremely preferably, the total of the ratio of change in dimensions before and after the removal of the metal foil and the ratio of change in dimensions before and after heating at 250° C. for 30 minutes of the laminate from which the metal foil has been removed is in a range of −0.06 to +0.06 both in the MD direction and in the TD direction. The ratio of change in dimensions before and after the removal of the metal foil is represented by the ratio of the difference between a predetermined dimension of the flexible metal-clad laminate before etching and a predetermined dimension after etching to the predetermined dimension before etching. The ratio of change in dimensions before and after heating is represented by the ratio of the difference between a predetermined dimension of the flexible metal-clad laminate after etching and a predetermined dimension after heating to the predetermined dimension before heating (after etching).

If the ratio of change in dimensions is out of the above range, the change in dimensions increases in the flexible metal-clad laminate after fine interconnections are formed and during mounting of components, and deviations occur from the component mounting positions originally designed. As a result, the components mounted and the substrate are likely not to be connected to each other satisfactorily. In other words, if the ratio of change in dimensions is within the above range, it can be considered that no problems occur in the components mounted.

The method for measuring the ratios of change in dimensions is not particularly limited. Any known method that can measure an increase or decrease in dimensions in the flexible metal-clad laminate before and after etching or heating may be used.

Herein, it is essential to measure the ratio of change in dimensions both in the MD direction and in the TD direction. When imidization and lamination are continuously performed, since different tensions are applied in the MD direction and in the TD direction, there is a difference in the degree of thermal expansion and shrinkage, and also there is a difference in the ratio of change in dimensions. Consequently, in the material having a low ratio of change in dimension, it is required that the ratio of change is low both in the MD direction and in the TD direction. In the present invention, extremely preferably, the total of the ratio of change in dimensions before and after the removal of the metal foil and the ratio of change in dimensions before and after heating at 250° C. for 30 minutes of the laminate from which the metal foil has been removed is in a range of −0.06 to +0.06 both in the MD direction and in the TD direction.

Specific conditions in the etching step when the ratio of change in dimensions is measured are not particularly limited. That is, etching conditions vary depending on the type of the metal foil, the shape of wiring pattern to be formed, etc., and thus, in the present invention, the etching step may be performed under any known conditions when the ratio of change in dimensions is measured. Similarly, in the heating step, specific conditions are not particularly limited as long as heating is performed at 250° C. for 30 minutes.

As described above, by etching the metal foil to form a desired wiring pattern, the flexible metal-clad laminate produced by the method according to the present invention can be used as a flexible printed circuit board on which various miniaturized, high-density components are mounted. Of course, the application of the present invention is not limited thereto. The present invention can be used in various applications including laminates containing metal foils.

EXAMPLES

While the present invention will be described specifically based on the examples below, it is to be understood that the present invention is not limited thereto.

In the synthesis examples, examples, and comparative examples described below, the glass transition temperature of the thermoplastic polyimide, the angle of molecular orientation axis and the coefficient of linear expansion of the polyimide film, the ratio of change in dimensions of the flexible metal-clad laminate, and the metal foil peel strength were evaluated by the methods described below.

(Glass Transition Temperature)

The glass transition temperature was determined from the inflection point of the storage modulus measured with a DMS200 manufactured by Seiko Instruments Inc. at a heating rate of 3° C./min in a range from room temperature to 400° C.

(Angle of Molecular Orientation Axis of Film)

The angle $\theta$ of molecular orientation axis of the core film was measured using a microwave molecular orientation analyzer Model MOA-2012A manufactured by KS Systems Co., Ltd. The definition of the angle $\theta$ of molecular orientation axis will be described below.

The direction of molecular orientation in the film plane can be determined as an angle using the molecular orientation analyzer, the direction of molecular orientation being defined as the direction in which $\in'$ is maximum, where $\in'$ is a dielectric constant of the sample. In the present invention, a line indicating the direction of orientation is defined as an "orientation axis" of the sample.

As shown in FIG. 2, the x-axis is set in the longitudinal direction (MD direction) at the center of the film, and the travelling direction of polyamic acid cast onto a support is defined as the positive direction. An angle between the positive direction of the x-axis and the orientation axis measured as described above is defined as an angle $\theta$ of orientation axis. When the orientation axis lies in the first and third quadrants, the angle of orientation axis is defined as being positive ($0°<\theta\leq 90°$). When the orientation axis lies in the second and fourth quadrants, the angle of orientation axis is defined as being negative ($-90°\text{ C.}\leq\theta<0°$). As shown in FIG. 3, the angle of orientation axis was measured with respect to five points, i.e., both ends, the center, and the middle between the center and each end of the film in the TD direction.

(Coefficient of Linear Expansion)

The coefficient of linear expansion of the core film was measured using a thermal mechanical analysis apparatus manufactured by Seiko Instruments Inc. (trade name: TMA (Thermomechanical Analyzer) 120° C.), in which, under a nitrogen stream, after the temperature was increased from 20° C. to 400° C. at a rate of 10° C./min, the average value in a range of 200° C. to 300° C. measured in the temperature range of 20° C. to 400° C. increased at a rate of 10° C./min was obtained.

(Ratio of Change in Dimensions)

Four holes were formed in a flexible laminate according to JIS C6481, and the respective distances among the holes were measured. Subsequently, a metal foil was removed from the flexible laminate by etching, and the etched flexible laminate was left to stand in a thermostatic chamber at 20° C. and 60% RH for 24 hours. The respective distances among the four holes were measured in the same manner as that before the etching. The ratio of change in dimensions was calculated according to the expression below, wherein D1 is an observed distance among the holes before removal of the metal foil, and D2 is an observed distance among the holes after removal of the metal foil.

Ratio of change in dimensions (%)=$\{(D2-D1)/D1\}\times 100$

Subsequently, the sample for measurement which had been subjected to etching was heated at 250° C. for 30 minutes, and then left to stand in a thermostatic chamber at 20° C. and 60% RH for 24 hours. The respective distances among the four holes were measured. The ratio of change in dimensions before and after heating was calculated according to the expression below, wherein D3 is an observed distance among the holes.

Ratio of change in dimensions (%)=$\{(D3-D2)/D2\}\times 100$

The ratio of change in dimensions was measured both in the MD direction and in the TD direction.

(Peel Strength of Metal Foil: Adhesion Strength)

A sample was prepared according to JIS C6471 "6.5 peel strength", and a metal foil portion with a width of 5 mm was peeled off at a peel angle of 180° and at 50 mm/min, and the load required was measured.

Synthesis Example 1

Synthesis of Polyimide Film

In the presence of a N,N'-dimethylacetamide solvent, polymerization of pyromellitic dianhydride/p-phenylenebis(trimellitic acid monoester anhydride)/4,4'-diaminodiphenyl ether (4,4'-oxydianiline)/para-phenylenediamine, at a molar ratio of 1/1/1/1, was performed so that the solid content was 18%.

The polymerization solution was cooled to about 0° C., and 2.1 mole percent of acetic anhydride and 1.1 mole percent of isoquinoline were added per mole of amic acid in the organic solvent solution of the polyamic acid cooled to about 0° C. After stirring was performed thoroughly, the resulting mixture was extruded from a die that was retained at about 5° C. and cast and applied onto an endless belt. The applied mixture was heated at 140° C. or less on the endless belt, and thereby a gel film with a residual component ratio of 54% was produced.

The resulting green sheet (gel film) having self-supporting properties was stripped off. Subsequently, with both ends of the sheet being fixed, without looseness, on a pin seat for continuously transporting the film, the film was transported through hot-air heating furnaces, a far-infrared furnace, and a slow-cooling furnace. When the film was discharged from the slow-cooling furnace, the film was detached from the pins and taken up. An 18-μm-thick polyimide film with a width of 1.2 m was thereby produced. The step of decreasing the distance between the both end-fixing points to produce a state loosened in the TD direction was completed before the film was carried into the furnace, and the step of increasing the distance between the both end-fixing points was carried out in a third furnace (refer to FIG. 4). The atmosphere temperature and the residence time in the hot-air heating furnaces (first to third furnaces), the far-infrared furnace, and the slow-cooling furnace are shown in Table 1. The shrinkage rate and the expansion rate (together referred to as the "degree of expansion and shrinkage"), and the angle of molecular orientation axis of the resulting film are shown in Table 2. In Table 2, symbol − indicates a loosened state of the film, and symbol + indicates expansion of the film.

Synthesis Example 2

Synthesis of Polyimide Film

A film was produced as in Synthesis Example 1 except that the degree of expansion and shrinkage was changed as shown in Table 2. The angles of molecular orientation axis of the resulting film are shown in Table 2.

Synthesis Example 3

Synthesis of Polyimide Film

A film was produced as in Synthesis Example 1 except that the heating conditions and the degree of expansion and shrinkage were changed as shown in Tables 1 and 2. The angles of molecular orientation axis of the resulting film are shown in Table 2.

Synthesis Example 4

Synthesis of Polyimide Film

A film was produced as in Synthesis Example 1 except that the heating conditions and the degree of expansion and shrinkage were changed as shown in Tables 1 and 2. The angles of molecular orientation axis of the resulting film are shown in Table 2.

Synthesis Example 5

Synthesis of Polyimide Film

An organic solvent solution of a polyamic acid was prepared as in Synthesis Example 1, and 2.1 mole percent of acetic anhydride and 1.1 mole percent of isoquinoline were added per mole of amic acid in the organic solvent solution of the polyamic acid. After stirring was performed thoroughly, the resulting mixture was extruded from a die that was retained at about 5° C. and cast and applied onto an endless belt. The applied mixture was heated at 140° C. or less on the endless belt, and thereby a gel film with a residual component ratio of 60% was produced.

The resulting green sheet (gel film) having self-supporting properties was stripped off. Subsequently, with both ends of the sheet being fixed on a pin seat for continuously transporting the film, the film was transported through hot-air heating furnaces, a far-infrared furnace, and a slow-cooling furnace. When the film was discharged from the slow-cooling furnace, the film was detached from the pins and taken up. An 18-μm-thick polyimide film with a width of about 0.5 m was thereby produced.

The step of decreasing the distance between the both end-fixing points to produce a state loosened in the TD direction was completed before the film was carried into the furnace. The atmosphere temperature and the residence time in the heating furnaces (first to fourth furnaces), the far-infrared furnace, and the slow-cooling furnace are shown in Table 3. The degree of expansion and shrinkage and the angle of molecular orientation axis of the resulting film are shown in Table 4.

Synthesis Example 6

Synthesis of Polyimide Film

A film was produced as in Synthesis Example 5 except that the heating conditions and the degree of expansion and shrinkage were changed as shown in Tables 3 and 4. The angles of molecular orientation axis of the resulting film are shown in Table 4.

Synthesis Example 7

Synthesis of Polyimide Film

A film was produced as in Synthesis Example 5 except that the heating conditions and the degree of expansion and shrinkage were changed as shown in Tables 3 and 4. The angles of molecular orientation axis of the resulting film are shown in Table 4.

Synthesis Example 8

Synthesis of Thermoplastic Polyimide Precursor

A 2,000-mL glass flask was charged with 780 g of DMF and 115.6 g of 2,2-bis[4-(4-aminophenoxy)phenyl] propane (hereinafter also referred to as "BAPP"), and 78.7 g of BPDA was gradually added thereto under stirring in a nitrogen atmosphere. Subsequently, 3.8 g of TMEG was added thereto, and stirring was performed for 30 minutes in an ice bath. A solution separately prepared by dissolving 2.0 g of TMEG in 20 g of DMF was gradually added to the reaction solution while monitoring the viscosity under stirring. Addition and stirring were stopped when the viscosity reached 3,000 poise. A polyamic acid solution was thereby prepared.

The resulting polyamic acid solution was cast onto a 25-μm-thick PET film (Cerapeel HP, manufactured by Toyo Metallizing Co., Ltd.) so as to have a final thickness of 20 μm, and drying was performed at 120° C. for 5 minutes. The dried self-supporting film was separated from the PET and fixed on a metal pin frame, and drying was performed at 150° C. for 5 minutes, at 200° C. for 5 minutes, at 250° C. for 5 minutes, and at 350° C. for 5 minutes. The glass transition temperature of the resulting single-layer sheet was measured to be 240° C.

Synthesis Example 9

Synthesis of Thermoplastic Polyimide Precursor

A 2,000-mL glass flask was charged with 780 g of DMF and 107.5 g of BAPP, and 54.9 g of benzophenonetetracarboxylic dianhydride (hereinafter also referred to as "BTDA") was gradually added thereto under stirring in a nitrogen atmosphere. Subsequently, 34.6 g of TMEG was added thereto, and stirring was performed for 30 minutes in an ice bath. A solution separately prepared by dissolving 3.0 g of TMEG in 20 g of DMF was gradually added to the reaction solution while monitoring the viscosity under stirring. Addition and stirring were stopped when the viscosity reached 3,000 poise. A polyamic acid solution was thereby prepared.

The resulting polyamic acid solution was cast onto a 25-μm-thick PET film (Cerapeel HP, manufactured by Toyo Metallizing Co., Ltd.) so as to have a final thickness of 20 μm, and drying was performed at 120° C. for 5 minutes. The dried self-supporting film was separated from the PET and fixed on a metal pin frame, and drying was performed at 150° C. for 5 minutes, at 200° C. for 5 minutes, at 250° C. for 5 minutes, and at 350° C. for 5 minutes. A single-layer sheet was thereby obtained. This thermoplastic polyimide had a glass transition temperature of 190° C.

Example 1

The polyamic acid solution prepared in Synthesis Example 8 was diluted with DMF to a solid concentration of 10% by weight, and then applied to both surfaces of the polyimide film produced in Synthesis Example 1 so that the thermoplastic polyimide layers (adhesive layers) each had a final thickness of 4 μm, followed by heating at 140° C. for 1 minute. Subsequently, thermal imidization was performed by passing the film through a far-infrared heating furnace with an atmosphere temperature of 390° C. for 20 seconds under a tension of 8 kg/m. An adhesive film was thereby obtained. A rolled copper foil (BHY-22B-T, manufactured by Japan Energy Corporation) with a thickness of 18 μm was disposed on each surface of the resulting adhesive film, and a protective material (APICAL 125NPI, manufactured by Kaneka Corporation) was further disposed on each copper foil. Thermal lamination was continuously performed with the tension of the polyimide film being set at 0.4 N/cm, and at a lamination temperature of 360° C., a lamination pressure of 196 N/cm (20 kgf/cm), and a laminating rate of 1.5 m/min. A flexible metal-clad laminate according to the present invention was thereby produced.

Example 2

An adhesive film and a flexible metal-clad laminate were produced as in Example 1 except that the polyimide film obtained in Synthesis Example 2 was used instead of the polyimide film obtained in Synthesis Example 1.

Example 3

An adhesive film and a flexible metal-clad laminate were produced as in Example 1 except that the polyimide film obtained in Synthesis Example 3 was used instead of the polyimide film obtained in Synthesis Example 1.

Example 4

An adhesive film and a flexible metal-clad laminate were produced as in Example 1 except that the polyimide film obtained in Synthesis Example 5 was used instead of the polyimide film obtained in Synthesis Example 1.

Example 5

An adhesive film and a flexible metal-clad laminate were produced as in Example 1 except that the polyimide film obtained in Synthesis Example 6 was used instead of the polyimide film obtained in Synthesis Example 1.

Example 6

The polyamic acid solution prepared in Synthesis Example 9 was diluted with DMF to a solid concentration of 10% by weight, and then applied to both surfaces of the polyimide film produced in Synthesis Example 1 so that the thermoplastic polyimide layers (adhesive layers) each had a final thickness of 4 μm for each surface, followed by heating at 140° C. for 1 minute. Subsequently, thermal imidization was performed by passing the film through a far-infrared heating furnace with an atmosphere temperature of 330° C. for 20 seconds. An adhesive film was thereby obtained. A rolled copper foil (BHY-22B-T, manufactured by Japan Energy Corporation) with a thickness of 18 μm was disposed on each surface of the resulting adhesive film, and a protective material (APICAL 125NPI, manufactured by Kaneka Corporation) was further disposed on each copper foil. Thermal lamination was continuously performed with the tension of the polyimide film being set at 0.4 N/cm, and at a lamination temperature of 330° C., a lamination pressure of 196 N/cm (20 kgf/cm), and a laminating rate of 1.5 m/min. A flexible metal-clad laminate according to the present invention was thereby produced.

Example 7

An adhesive film and a flexible metal-clad laminate were produced as in Example 6 except that the polyimide film obtained in Synthesis Example 2 was used instead of the polyimide film obtained in Synthesis Example 1.

Example 8

An adhesive film and a flexible metal-clad laminate were produced as in Example 6 except that the polyimide film obtained in Synthesis Example 3 was used instead of the polyimide film obtained in Synthesis Example 1.

Example 9

An adhesive film and a flexible metal-clad laminate were produced as in Example 1 except that the polyimide film obtained in Synthesis Example 7 was used instead of the polyimide film obtained in Synthesis Example 1.

Comparative Example 1

An adhesive film and a flexible metal-clad laminate were produced as in Example 1 except that the polyimide film obtained in Synthesis Example 4 was used instead of the polyimide film obtained in Synthesis Example 1.

Comparative Example 2

An adhesive film and a flexible metal-clad laminate were produced as in Example 6 except that the polyimide film obtained in Synthesis Example 4 was used instead of the polyimide film obtained in Synthesis Example 1.

Reference Example 1

The polyamic acid solution prepared in Synthesis Example 9 was diluted with DMF to a solid concentration of 10% by weight, and then applied to both surfaces of the polyimide film produced in Synthesis Example 4 so that the thermoplastic polyimide layers (adhesive layers) each had a final thickness of 4 μm, followed by heating at 140° C. for 1 minute. The resulting film was cut into a 40 cm square, and with four sides thereof being fixed on a pin frame, thermal imidization was performed in a far-infrared furnace with an atmosphere temperature of 330° C. for 20 seconds. A sheet of adhesive film was thereby obtained.

Four sides of the resulting adhesive film were cut to form a 30-cm square film. A rolled copper foil (BHY-22B-T, manufactured by Japan Energy Corporation) with a thickness of 18 μm was disposed on each surface of the film, and a protective material (APICAL 125NPI, manufactured by Kaneka Corporation) was further disposed on each copper foil. Furthermore, a Kinyo Board (manufactured by Kinyosha Co., Ltd.) was disposed on each protective material layer. The resulting laminate was sandwiched between SUS plates, and pressed with a single-platen press at 330° C. and a pressure of 294 N/cm (30 kgf/cm) for 5 minutes. A flexible metal-clad laminate was thereby produced.

FIG. 5 shows the results of evaluation of properties of the flexible metal-clad laminates produced in Examples, Comparative Examples, and Reference Example.
Table 1
Table 2
Table 3
Table 4
Table 5

As is evident from Reference Example 1 and Comparative Examples 1 to 3, when the properties of the core film are out of the specified ranges, no problem arises in the case of a single-platen press; however, in the thermal lamination method, the change in dimensions is large in the resulting flexible metal-clad laminate due to the influence of tension.

In contrast, in Examples 1 to 8 in which all the properties are within the specified ranges, even if the flexible metal-clad laminate is formed by the thermal lamination method, the change in dimensions is suppressed, and adhesiveness is not degraded.

TABLE 1

| | Atmosphere temperature (° C.) | | | | |
|---|---|---|---|---|---|
| | First furnace | Second furnace | Third furnace | IR furnace | Slow-cooling furnace |
| Synthesis Example 1 | 177 | 324 | 450 | 570 | 520, 460, 410, 350, 290, 240 |
| Synthesis Example 2 | 177 | 324 | 450 | 570 | 520, 460, 410, 350, 290, 240 |
| Synthesis Example 3 | 180 | 330 | 450 | 570 | 520, 460, 410, 350, 290, 240 |
| Synthesis Example 4 | 350 | 400 | 450 | 570 | 520, 460, 410, 350, 290, 240 |
| Residence time (sec) | 30 | 30 | 20 | 60 | 40 |

TABLE 2

| | Degree of expansion and shrinkage | | | | Angle of molecular orientation axis (degree) | | | | | Coefficient of linear expansion (ppm/° C.) | |
|---|---|---|---|---|---|---|---|---|---|---|---|
| | Hot-air furnace | | | | | | | | | | |
| | First furnace | Second furnace | Third furnace | IR furnace | E | EC | C | WC | W | MD | TD |
| Synthesis Example 1 | −4.4 | 0.0 | 4.4 | 0.0 | −6 | −7 | −1 | −1 | 14 | 7 | 16 |
| Synthesis Example 2 | −4.4 | 0.0 | 2.2 | 0.0 | 0 | −5 | −2 | −2 | 7 | 9 | 15 |
| Synthesis Example 3 | −4.4 | 0.0 | 0.0 | 0.0 | −2 | −3 | −5 | −5 | 12 | 9 | 14 |
| Synthesis Example 4 | 0.0 | 0.0 | 0.0 | 0.0 | −33 | 32 | −85 | −40 | 13 | 12 | 11 |

TABLE 3

| | Atmosphere temperature (° C.) | | | | | |
|---|---|---|---|---|---|---|
| | First furnace | Second furnace | Third furnace | Fourth furnace | IR furnace | Slow-cooling furnace |
| Synthesis Examples 5 to 7 | 130 | 260 | 360 | 450 | 520 | 490, 465, 350 |
| Residence time (sec) | 50 | 50 | 50 | 50 | 70 | 200 |

TABLE 4

| | Degree of expansion and shrinkage | | | Angle of molecular orientation axis (degree) | | | | | Coefficient of linear expansion (ppm/° C.) | |
|---|---|---|---|---|---|---|---|---|---|---|
| | Hot-air furnace | | | | | | | | | |
| | First furnace | Fourth furnace | IR furnace | MD | TD | C | WC | W | MD | TD |
| Synthesis Example 5 | −3.9 | 0.0 | 0.0 | −4 | −5 | −8 | −11 | −13 | 9 | 14 |
| Synthesis Example 6 | −3.9 | 3.9 | 0.0 | −5 | 1 | 6 | 3 | 8 | 8 | 15 |
| Synthesis Example 7 | −6.7 | 0.0 | 0.0 | −17 | −30 | −48 | 29 | 26 | 12 | 12 |

TABLE 5

| | Adhesion strength (N/cm) | Ratio of change in dimensions (%) | | | | | |
|---|---|---|---|---|---|---|---|
| | | After etching | | After heating | | Total | |
| | | MD | TD | MD | TD | MD | TD |
| Example 1 | 9 | −0.03 | −0.02 | −0.03 | +0.02 | −0.06 | 0.00 |
| Example 2 | 10 | −0.03 | −0.03 | −0.02 | +0.03 | −0.05 | 0.00 |
| Example 3 | 9 | −0.02 | −0.01 | −0.02 | +0.01 | −0.04 | 0.00 |
| Example 4 | 9 | −0.02 | 0.00 | −0.02 | +0.01 | −0.04 | +0.01 |
| Example 5 | 10 | −0.03 | 0.00 | −0.02 | +0.02 | −0.05 | +0.02 |
| Example 6 | 9 | −0.03 | −0.02 | −0.03 | +0.03 | −0.06 | +0.01 |
| Example 7 | 10 | −0.02 | −0.03 | −0.03 | +0.03 | −0.05 | 0.00 |
| Example 8 | 10 | −0.02 | −0.01 | −0.03 | +0.01 | −0.05 | 0.00 |
| Comparative Example 1 | 9 | −0.05 | +0.04 | −0.07 | +0.05 | −0.12 | +0.09 |
| Comparative Example 2 | 9 | −0.06 | +0.04 | −0.07 | +0.04 | −0.13 | +0.08 |
| Comparative Example 3 | 9 | −0.08 | +0.06 | −0.06 | +0.04 | −0.04 | +0.10 |
| Reference Example 1 | 8 | +0.03 | +0.03 | +0.01 | +0.01 | +0.04 | +0.04 |

The invention claimed is:

1. A method for producing a flexible metal-clad laminate, the method comprising laminating a metal foil to an adhesive film with a thermal roll laminator including at least one pair of metal rollers, the adhesive film including a polyimide film and an adhesive layer containing a thermoplastic polyimide, the adhesive layer being disposed on at least one surface of the polyimide film, the method comprising forming the polyimide film by a process comprising:

step (A) of casting and applying a solution containing a polyamic acid onto a support to form a gel film;

step (B) of stripping off the gel film and fixing both ends of the gel film; and step (C) of heating and transporting the film with both ends being fixed, wherein in at least a portion of step (C), the film is transported in a state loosened in the TD direction such that a distance between from one fixed end to a second fixed end of said both ends of gel film is smaller than a width of the film.

2. The method according to claim 1, wherein the loosened state is achieved before the film is heated and transported.

3. The method according to claim 1, wherein the polyimide film satisfies relationship −15≦θ≦15 at any position in the width direction (TD direction) of the film, wherein θ(°) is the angle of molecular orientation axis to the MD direction of the polyimide film.

4. The method according to claim 1, wherein the polyimide film satisfies relationships $2 \leq \alpha_1 \leq 10$, $13 \leq \alpha_2 \leq 25$, and $20 \leq (\alpha_1 + \alpha_2) \leq 40$, wherein $\alpha_1$ (ppm/° C.) is the coefficient of linear expansion (200° C. to 300° C.) of the polyimide film in the MD direction, and $\alpha_2$ (ppm/° C.) is the coefficient of linear expansion (200° C. to 300° C.) of the polyimide film in the TD direction.

5. The method according to claim 1, said method being a method for producing such a flexible metal-clad laminate that a total of a rate of change in dimensions before and after removal of the metal foil and a ratio of change in dimensions before and after heating the flexible metal-clad laminate from which the metal foil has been removed at 250° C. for 30 minutes is in a range of −0.06% to +0.06% both in the MD direction and in the TD direction.

* * * * *